United States Patent
Suk

(10) Patent No.: US 9,752,875 B2
(45) Date of Patent: Sep. 5, 2017

(54) VIRTUAL SPORT SYSTEM FOR ACQUIRING GOOD IMAGE OF BALL BY CONTROLLING CAMERA ACCORDING TO SURROUNDING BRIGHTNESS

(71) Applicant: CREATZ INC., Seoul (KR)

(72) Inventor: Yong Ho Suk, Seongnam-si (KR)

(73) Assignee: CREATZ INC., Seoul (KR)

( * ) Notice: Subject to any disclaimer, the term of this patent is extended or adjusted under 35 U.S.C. 154(b) by 0 days.

(21) Appl. No.: 14/346,733

(22) PCT Filed: Sep. 24, 2012

(86) PCT No.: PCT/KR2012/007666
§ 371 (c)(1),
(2) Date: Mar. 23, 2014

(87) PCT Pub. No.: WO2013/043016
PCT Pub. Date: Mar. 28, 2013

(65) Prior Publication Data
US 2014/0235304 A1    Aug. 21, 2014

(30) Foreign Application Priority Data
Sep. 23, 2011  (KR) .................. 10-2011-0096352

(51) Int. Cl.
| | |
|---|---|
| G06K 9/00 | (2006.01) |
| G01C 11/02 | (2006.01) |
| A63F 13/20 | (2014.01) |
| G06T 7/20 | (2017.01) |
| A63B 24/00 | (2006.01) |

(Continued)

(52) U.S. Cl.
CPC .......... *G01C 11/02* (2013.01); *A63B 24/0021* (2013.01); *A63B 71/022* (2013.01);
(Continued)

(58) Field of Classification Search
CPC ........ A63B 2024/0034; A63B 24/0021; A63B 71/022; A63B 2220/05; A63B 2220/13;
(Continued)

(56) References Cited

U.S. PATENT DOCUMENTS

| | | | | |
|---|---|---|---|---|
| 8,428,352 B1 * | 4/2013 | Smith | .................. | G06K 9/4661 345/589 |
| 2002/0176010 A1 * | 11/2002 | Wallach | ............... | H04N 5/2355 348/229.1 |

(Continued)

FOREIGN PATENT DOCUMENTS

| | | |
|---|---|---|
| JP | 2011-015760 A | 1/2011 |
| KR | 10-2009-0105279 A | 10/2009 |

(Continued)

*Primary Examiner* — Justin Myhr

(57) ABSTRACT

The present invention relates to a virtual sport system for acquiring a good image of a ball by controlling a camera according to the surrounding brightness. One embodiment of the present invention provides a virtual sport system which comprises a photographing unit, having a camera for acquiring an image of a ball, and a simulator, for calculating the physical quantity of the ball on the basis of the image of the ball; and which further comprises a control unit that extracts image information from at least one image acquired by the photographing unit by means of the camera, and determining, on the basis of the image information, a control signal for adjusting the image gain or the exposure time of the camera.

8 Claims, 4 Drawing Sheets

(51) Int. Cl.
*A63B 71/02* (2006.01)
*A63F 13/00* (2014.01)
*G06T 7/246* (2017.01)
*A63B 69/36* (2006.01)
*G01C 11/36* (2006.01)

(52) U.S. Cl.
CPC ............ *A63F 13/005* (2013.01); *A63F 13/20* (2014.09); *G06T 7/20* (2013.01); *G06T 7/246* (2017.01); *A63B 69/3661* (2013.01); *A63B 2024/0034* (2013.01); *G01C 2011/36* (2013.01); *G06T 2207/10016* (2013.01); *G06T 2207/10028* (2013.01); *G06T 2207/10048* (2013.01); *G06T 2207/30224* (2013.01); *G06T 2207/30241* (2013.01)

(58) Field of Classification Search
CPC ............ A63B 2220/16; A63B 2220/30; A63B 2220/35; A63B 2243/0029; A63B 24/0003; A63B 69/3658; A63F 13/005; G01C 11/02; G01C 2011/36; G06T 2207/30241; G06T 7/20; G06T 7/204
See application file for complete search history.

(56) References Cited

U.S. PATENT DOCUMENTS

| | | | |
|---|---|---|---|
| 2004/0032970 A1* | 2/2004 | Kiraly | A63B 24/0021 382/103 |
| 2009/0042627 A1* | 2/2009 | Nicora | A63B 24/0003 463/2 |
| 2009/0091652 A1* | 4/2009 | Wernersson | H04N 5/2354 348/371 |
| 2009/0160944 A1* | 6/2009 | Trevelyan | H04N 5/2354 348/187 |
| 2010/0050732 A1 | 3/2010 | Lin | |
| 2011/0298947 A1* | 12/2011 | Guo | H04N 5/2354 348/224.1 |

FOREIGN PATENT DOCUMENTS

| | | |
|---|---|---|
| KR | 10-2009-0112538 A | 10/2009 |
| KR | 10-1019829 B1 | 3/2011 |
| KR | 10-1048864 B1 | 7/2011 |
| TW | 201011448 A | 3/2010 |

* cited by examiner

VIRTUAL SPORT SYSTEM FOR ACQUIRING GOOD IMAGE OF BALL BY CONTROLLING CAMERA ACCORDING TO SURROUNDING BRIGHTNESS

FIELD OF THE INVENTION

The present invention relates to a virtual sport system for acquiring good images of a ball by controlling a camera according to ambient brightness.

BACKGROUND

Virtual golf systems are widely spreading which allow golfers to virtually play golf at low cost in downtown areas and the like. The basic concept of such virtual golf systems is to acquire a number of photographed images of a golf ball upon being hit by a golfer, measure physical quantities of the golf ball on the basis of the trajectory, interval, size and the like thereof, perform a simulation of the shot, and display a result of the simulation on a screen. In the virtual golf systems, it is important to acquire the photographed images of the golf ball as good as possible.

In this connection, a technique for photographing a golf training session while adjusting the location or color of illumination to acquire more diverse images of a golf ball has been disclosed in Korean Laid-open Patent Publication No. 10-2009-0112538 (entitled, "APPARATUS FOR OBTAINING GOLF IMAGES USING ILLUMINATION CONTROL, AND GOLF PRACTICE SYSTEM BASED ON IMAGE PROCESSING USING IT"), the contents of which are incorporated herein by reference in its entirety. However, various conventional techniques including the above one have not been much concerned with acquiring good images of a golf ball, i.e., the images that allow the trajectory, interval, size and the like thereof to be accurately determined.

Therefore, following the introduction of a remarkable virtual golf system in Korean Patent No. 1048864 (entitled, "METHOD OF MEASURING PHYSICAL QUANTITIES OF OBJECT BY USING SINGLE LIGHT SOURCE AND PLANAR SENSOR UNIT AND VIRTUAL GOLF SYSTEM UTILIZING SAME") (the contents of which are incorporated herein by reference in its entirety), the inventor(s) now present a novel feature to combine with such virtual golf systems, other virtual golf systems, systems for virtually playing other kinds of sports (e.g., baseball, football, etc.), or the like to enable them to produce more accurate simulation results.

SUMMARY OF THE INVENTION

One object of the present invention is to acquire good images of a ball.

Another object of the invention is to enable a virtual sport system to produce a more accurate simulation result.

According to one aspect of the invention to achieve the objects as described above, there is provided a virtual sport system, comprising: a photographing unit comprising a camera to acquire images of a ball; and a simulator to calculate physical quantities of the ball on the basis of the images of the ball, wherein the photographing unit further comprises a control unit to extract visual information from at least one image acquired by the camera and determine a control signal for adjusting an exposure time or video gain of the camera on the basis of the visual information.

In addition, there may be further provided other systems to implement the present invention.

According to the invention, good images of a ball may be acquired.

According to the invention, a virtual sport system may produce a more accurate simulation result.

DETAILED DESCRIPTION OF THE PREFERRED EMBODIMENTS

Figure 1:
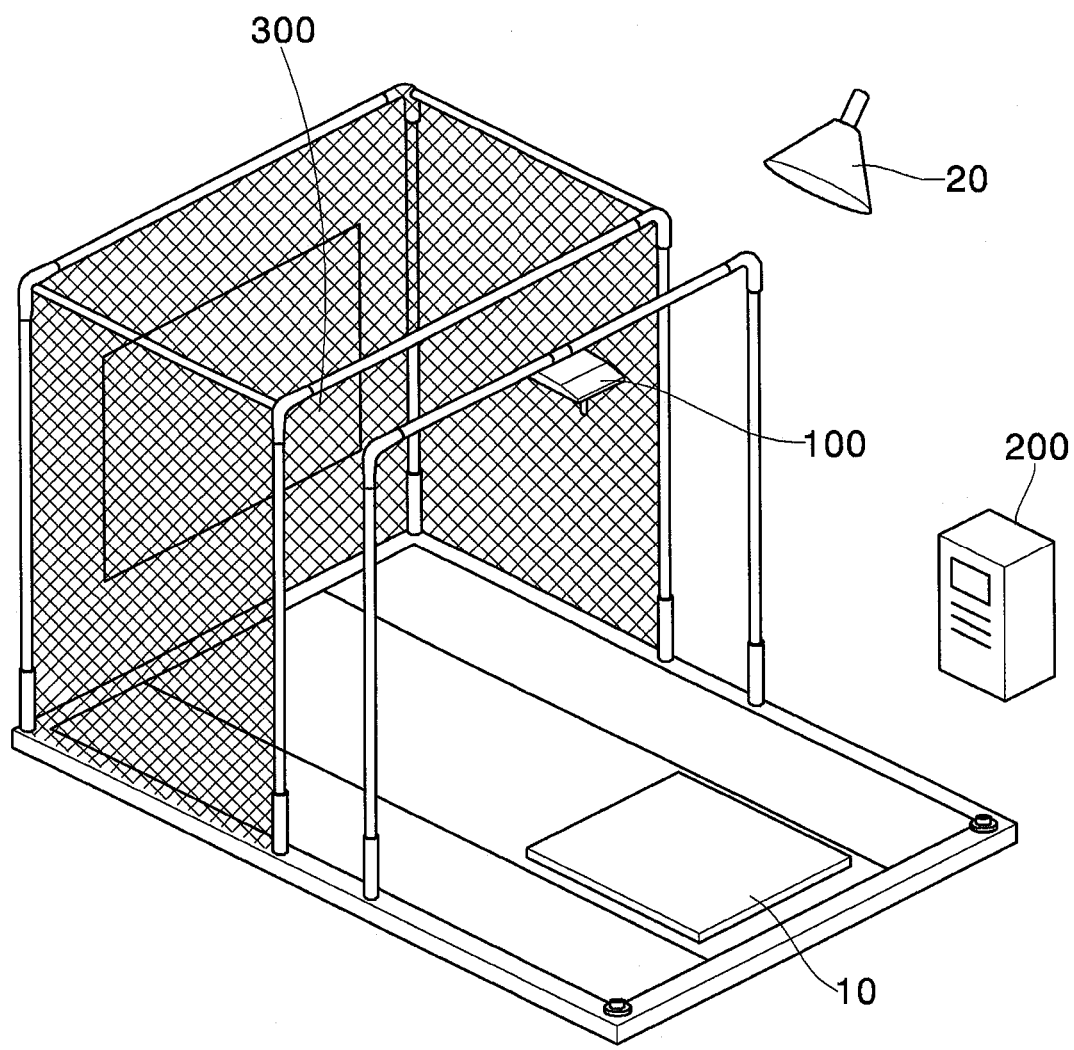
FIG. 1 is a schematic diagram of the overall configuration of a virtual golf system according to one embodiment of the invention.

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

FIG. 1 is a schematic diagram of the overall configuration of a virtual golf system according to one embodiment of the invention.

As shown in FIG. 1, the virtual golf system may be configured to comprise a shot unit 10, an illumination device 20, a photographing unit 100, a simulator 200 and a display device 300.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be note that when the invention is applied to other kinds of virtual sport systems, those skilled in the art may modify the configuration of the shot unit 10 and, if necessary, those of other components associated therewith to suit to the characteristics of the corresponding sports.

Next, the illumination device 20 according to one embodiment of the invention may irradiate light artificially when a golfer plays virtual golf indoors or outdoors. As necessary, the illumination device 200 may be turned on and off, or the brightness thereof may be adjusted. Preferably, the illumination device 20 may be an infrared illumination device for preventing natural deterioration of the images of the golf ball caused by the flickering of the light.

Next, the photographing unit 100 according to one embodiment of the invention may comprise at least one camera (preferably infrared camera) (not shown) to perform a function to acquire one or more images of the golf ball (preferably images of the moving golf ball). As shown in FIG. 1, the photographing unit 100 may be disposed in a location to look down at the moving golf ball, while it may be disposed in other locations.

An image of the golf ball can be considered to be good if the image is clear such that a central point thereof may be well identified or a diameter or area thereof may be well measured. For example, if images of the golf ball are clearer, the simulator 200 to be described below may more accurately identify the central points of the multiple images of the golf ball and calculate a movement trajectory of the golf ball. For another example, if images of the golf ball are clearer, the simulator 200 may more accurately identify the central points of the multiple images of the golf ball, recognize the intervals therebetween, and calculate a moving speed of the golf ball. For yet another example, if images of the golf ball are clearer, the simulator 200 may more accurately recognize the diameter or area of a specific image of the golf ball (e.g., an image photographed in a location closest to the location where the photographing unit 100 looks down at a ground surface vertically) and calculate a distance from the photographing unit 100 to the golf ball. (In many cases, this distance may be converted into a height of the golf ball.)

According to the present invention, an exposure time or video gain of the camera of the photographing unit 100 may be adaptively adjusted in order to acquire good images of the golf ball, which is important as mentioned above. The detailed configuration of the photographing unit 100 will be further described later with reference to FIG. 2.

Next, the simulator 200 according to one embodiment of the invention may perform a function to receive images of the golf ball from the photographing unit 100 and perform a simulation of the movement of the golf ball on the basis of the trajectory, interval, size and the like thereof according to conventional techniques. The simulator 200 may be similar to conventional virtual golf simulation devices.

The simulator 200 may communicate with the photographing unit 100 and the display device 300, and may comprise a dedicated processor for virtual golf simulation. The dedicated processor may be provided with memory means and have numerical operation and graphics processing capabilities.

The configuration of the simulator 200 will be further described later with reference to FIG. 3.

Lastly, the display device 300 according to one embodiment of the invention may perform a function to display a result of the numerical operation or graphics processing of the simulator 200. The display device 300 may display images via display means, and may preferably be configured with a screen, which absorbs the impact of the hit golf ball and does not emit light directly, and a projector to output images on the screen.

Configuration of Photographing Unit

Hereinafter, the internal configuration of the photographing unit 100 according to one embodiment of the invention and the functions of the respective components thereof will be described.

Figure 2:
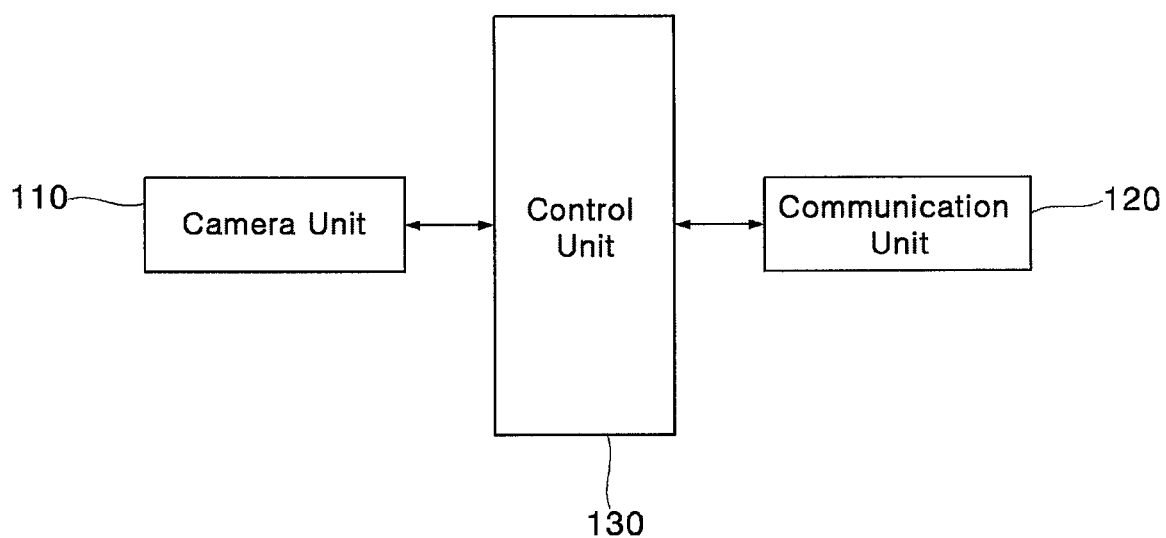
FIG. 2 is a detailed diagram of the internal configuration of a photographing unit 100 according to one embodiment of the invention.

FIG. 2 is a detailed diagram of the internal configuration of the photographing unit 100 according to one embodiment of the invention.

As shown in FIG. 2, the photographing unit 100 may be configured to comprise a camera unit 110, a communication unit 120 and a control unit 130.

According to one embodiment of the invention, at least some of the camera unit 110, the communication unit 120 and the control unit 130 may be program modules to communicate with the simulator 200. The program modules may be included in the photographing unit 100 in the form of operating systems, application program modules or other program modules, while they may be physically stored in a variety of commonly known storage devices. Further, the program modules may also be stored in a remote storage device that may communicate with the photographing unit 100. Meanwhile, such program modules may include, but not limited to, routines, subroutines, programs, objects, components, data structures and the like for performing specific tasks or executing specific abstract data types as will be described below in accordance with the present invention.

First, the camera unit 110 may comprise a camera that may optically acquire at least one image.

The camera of the camera unit 110 may photograph and acquire some images when a moving golf ball exists or not. The camera unit 110 may transmit the images to the control unit 130 to be described below.

Meanwhile, an exposure time or video gain of the camera of the camera unit 110 may be adaptively adjusted by the control of the control unit 130. The camera unit 110 may be configured with reference to techniques for conventional cameras with adaptive exposure control functionality.

Next, the communication unit 120 may perform a function to mediate data transmission/receipt between the control unit 130 and the simulator 200, as necessary. Although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Lastly, the control unit 130 may extract visual information from the images transmitted by the camera unit 110, determine a control signal for adjusting an exposure time or video gain of the camera of the camera unit 110 on the basis of the visual information, and transmit it to the camera unit 110.

First, the control unit 130 may extract visual information from the images from the camera unit 110. There is no particular limitation on the type of the visual information. For example, the visual information may be at least one of information on the overall brightness of an image, information on the average brightness of an image, information on the brightness of the brightest pixel in an image, information on the brightness of the darkest pixel in an image, and information on the difference between the brightness of the brightest and darkest pixels in an image.

Further, the control unit 130 may determine a control signal corresponding to an optimal exposure time or video gain with regard to the current visual information, by executing a function reflecting a formula pre-established through repeated experiments or the like (e.g., a function in which the correlation between the visual information and the optimal camera exposure time is formulated) or by referring to a lookup table pre-established through repeated experiments or the like (e.g., a table indicating the correlation between the visual information and the optimal camera exposure time).

For example, if the visual information is information on the overall brightness of an image, then the above function or lookup table may be intended for a control signal for further reducing the camera exposure time as the overall brightness of the image is higher. For another example, if the visual information is information on the average brightness of an image, then the above function or lookup table may be intended for a control signal for further reducing the camera exposure time as the average brightness of the image is higher.

The control signal determined as described above may be transmitted from the control unit 130 to the camera unit 110 to change the exposure time or video gain of the camera.

According to one embodiment of the invention, for a short time period, the control unit 130 may at one time extract the visual information (e.g., the overall brightness) of an image photographed when the illumination device 20 is turned on, and at another time extract the visual information (e.g., the overall brightness) of another image photographed when the illumination device 20 is turned off. Then, the control unit 130 may optimize the exposure time or video gain of the camera based on both of the visual information or information on the difference therebetween (e.g., the difference between the brightness of the two images). For example, when the difference between the visual information is small, the control unit 130 may consider that the surrounding environment is bright even without the illumination device 20, and may control the exposure time of the camera to be reduced.

In this embodiment, the control unit 130 may further control the illumination device 20 to be turned on and off, as necessary.

Figure 4:
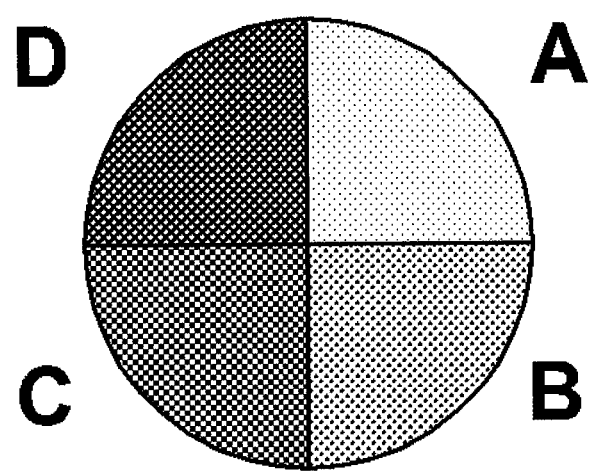
FIG. 4 shows a reference subject according to one embodiment of the invention.

According to another embodiment of the invention, the control unit 130 may control the camera of the camera unit 110 assuming that the camera photographs a simply devised reference subject other than a golf ball or a ground surface to acquire images thereof. For example, when a reference subject as shown in FIG. 4 is photographed by the camera, the control unit 130 may extract visual information from the corresponding images. The visual information may vary significantly according to the ambient brightness, even though the reflectance of each section of the reference subject (any one of sections A to D) is uniform. Thus, upon recognizing that the reference subject is being photographed by the camera according to the manipulation of a golfer or the like, the control unit 130 may control the exposure time or video gain of the camera to be adjusted with reference to, for example, a pre-established table for the reference subject. This control may preferably allow the images of all or some of the four sections of the reference subject to be well distinguished from the ground surface.

According to yet another embodiment of the invention, the various aspects of control of the control unit 130 as described above may be implemented not only based on the images photographed just for a while, but also according to a kind of feedback control principle. For example, the control unit 130 may change the exposure time or video gain of the camera to a certain degree on the basis of the images received from the camera unit 110 for the first time, and then receive the improved images from the camera unit 110 for the second time. If the control unit 130 decides that the improved images still fail to meet some criteria predefined therein, then it may further change the exposure time or video gain of the camera again. The control unit 130 may repeat the above feedback control until it eventually receives the appropriate images meeting the criteria, and the exposure time or video gain of the camera at this time may be considered to be optimal in view of the current ambient brightness.

Configuration of Simulator

Hereinafter, the internal configuration of the simulator 200 according to one embodiment of the invention and the functions of the respective components thereof will be described.

Figure 3:
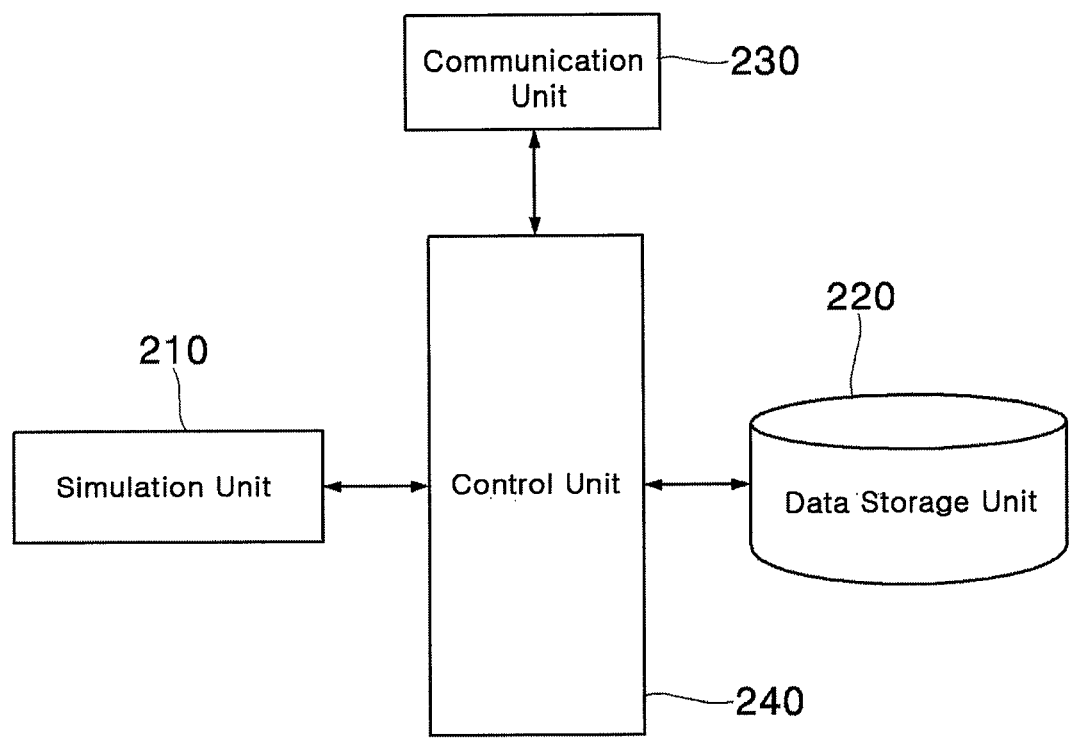
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise a simulation unit 210, a data storage unit 220, a communication unit 230 and a control unit 240.

According to one embodiment of the invention, at least some of the simulation unit 210, the data storage unit 220, the communication unit 230 and the control unit 240 may be program modules to communicate with the photographing unit 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

First, the simulation unit 210 may receive good images of a golf ball from the photographing unit 100 and perform a virtual golf simulation on the basis thereof. That is, the simulation unit 210 may calculate a movement trajectory, moving speed, or height of the golf ball from the images thereof, as described above.

Further, the simulation unit 210 may transmit to the display device 300 a control signal reflecting the movement of the golf ball in a graphical object or containing a video signal, so that the movement of the golf ball may be realistically displayed in the display device 300.

Next, the data storage unit 220 may store information on the calculated physical quantities of the golf ball, or information required for the simulation. The data storage unit 220 may comprise a computer-readable recording medium.

Next, the communication unit 230 may perform a function to enable data transmission/receipt to/from the simulation unit 210 and the data storage unit 220. Although there is no particular limitation on the communication modality that may be employed by the communication unit 230, wired communication such as wired LAN communication and cable communication, or wireless communication such as wireless LAN communication, infrared communication, RF communication and Bluetooth communication may preferably be employed.

Lastly, the control unit 240 may perform a function to control data flow among the simulation unit 210, the data storage unit 220 and the communication unit 230. That is, the control unit 240 according to the present invention may control data flow into/out of the simulator 200 or data flow among the respective components of the simulator 200, such that the simulation unit 210, the data storage unit 220 and the communication unit 230 may carry out their particular functions, respectively.

Although it has been mainly described above that the system of the present invention is a virtual golf system, it will be apparent to those skilled in the art that the technical principle and configuration of the invention may be applied to all kinds of virtual sport systems (e.g., virtual baseball systems or virtual football systems) requiring simulation of the movement of a ball.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help general understanding of the invention, and the present invention is not limited to the above embodiments. It will be appreciated by a person of ordinary skill in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A virtual sport system, comprising:
a photographing unit comprising a camera to acquire images of a ball; and
a simulator to calculate physical quantities of the ball on the basis of the images of the ball,
wherein the photographing unit further comprises a control unit to extract visual information from at least one image acquired by the camera and determine a control signal for adjusting an exposure time or video gain of the camera on the basis of the visual information,
wherein the control unit extracts visual information from at least one other image acquired by the camera with the adjusted exposure time or video gain, and further adjusts the exposure time or video gain of the camera if the visual information fails to meet a predefined criteria, and
wherein the camera further acquires at least one image of a reference subject comprising at least two regions each having a uniform reflectance, the reflectances of the at least two regions being different from each other, and the control unit determines the control signal on the basis of visual information extracted from the at least one image of the reference subject with two or more regions, each region having a reflectance different from each other, such that at least some of the at least two regions in the reference subject are distinguished from a ground surface.

2. A virtual sport system as claimed in claim 1, wherein the camera is an infrared camera.

3. A virtual sport system as claimed in claim 1, wherein the physical quantities of the ball are at least one of a movement trajectory, moving speed and height of the ball.

4. A virtual sport system as claimed in claim 3, wherein the height of the ball is converted on the basis of the distance from the photographing unit to the ball.

5. A virtual sport system as claimed in claim 1, wherein the visual information is at least one of information on the overall brightness of the corresponding image, information on the average brightness of the corresponding image, information on the brightness of the brightest part in the corresponding image, information on the brightness of the darkest part in the corresponding image, and information on the difference between the brightness of the brightest and darkest parts in the corresponding image.

6. A virtual sport system as claimed in claim 1, further comprising an illumination device, wherein the control unit controls the illumination device to be turned on and off.

7. A virtual sport system as claimed in claim 6, wherein the at least one image is two images, and wherein a first of the two images is acquired when the illumination device is turned on and a second of the two images is acquired when the illumination device is turned off.

8. A virtual sport system as claimed in claim 7, wherein the visual information is information on the difference between the visual information corresponding to the first image and that corresponding to the second image.

* * * * *